United States Patent
Germe

(10) Patent No.: US 12,489,527 B2
(45) Date of Patent: Dec. 2, 2025

(54) APPARATUS AND METHODS FOR EXCHANGING DATA IN A HYBRID OPTICAL WIRELESS COMMUNICATION SYSTEM

(71) Applicant: SIGNIFY HOLDING B.V., Eindhoven (NL)

(72) Inventor: Michel Germe, Cormelles le Royal (FR)

(73) Assignee: SIGNIFY HOLDING B.V., Eindhoven (NL)

( * ) Notice: Subject to any disclaimer, the term of this patent is extended or adjusted under 35 U.S.C. 154(b) by 338 days.

(21) Appl. No.: 18/270,273

(22) PCT Filed: Dec. 27, 2021

(86) PCT No.: PCT/EP2021/087690
§ 371 (c)(1),
(2) Date: Jun. 29, 2023

(87) PCT Pub. No.: WO2022/148686
PCT Pub. Date: Jul. 14, 2022

(65) Prior Publication Data
US 2024/0113780 A1    Apr. 4, 2024

(30) Foreign Application Priority Data

Jan. 7, 2021    (EP) .................................... 21150473

(51) Int. Cl.
*H04B 10/114*    (2013.01)
*H04B 10/116*    (2013.01)
(52) U.S. Cl.
CPC ..... *H04B 10/1143* (2013.01); *H04B 10/1149* (2013.01); *H04B 10/116* (2013.01)

(58) Field of Classification Search
CPC ............ H04B 10/1143; H04B 10/1149; H04B 10/116
(Continued)

(56) References Cited

U.S. PATENT DOCUMENTS

| 2016/0218804 A1* | 7/2016 | Raj ................... H04B 10/1149 |
| 2019/0123872 A1 | 4/2019 | Au et al. |
| 2019/0319705 A1 | 10/2019 | Harris et al. |

FOREIGN PATENT DOCUMENTS

| CN | 109728852 A | | 5/2019 | |
| EP | 3635883 B1 * | | 2/2023 | ......... H04B 10/1149 |

(Continued)

OTHER PUBLICATIONS

Liu et al; Relay-Assisted Technology in Optical Wireless Communications: A Survey, Nov. 2020, IEEE Access; pp. 1-26. (Year: 2020).*

(Continued)

*Primary Examiner* — Amritbir K Sandhu

(57) ABSTRACT

In an optical wireless communication, OWC, system, an apparatus (200) is configured to operate in a first mode to enable a first functionality where the apparatus acts as a bridge device between an OWC access point (400) and a first end device out of one or more end devices (300a, 300b, 300c, 300d), or in a second mode to enable a second functionality where the apparatus relays data between the first end device and a second end device out of the one or more end devices (300a, 300b, 300c, 300d). The apparatus (200) communicates with the OWC access point (400) by means of a first type of optical wireless link (450) using a first modulation scheme; and communicates with the first end device by means of a second type of optical wireless link (350) using a second modulation scheme. The first type of (Continued)

optical wireless link (450) has a wider beam angle than the second type of optical wireless link (350).

15 Claims, 4 Drawing Sheets

(58) Field of Classification Search
USPC .......................................................... 398/204
See application file for complete search history.

(56) References Cited

FOREIGN PATENT DOCUMENTS

| WO | WO-2015139159 A1 | * | 9/2015 | ............... H04B 1/38 |
| WO | WO-2018054894 A1 | * | 3/2018 | ............ H04B 10/114 |
| WO | WO-2019106341 A1 | * | 6/2019 | ............ H04B 10/116 |
| WO | 2020074920 A1 | | 4/2020 | |
| WO | WO-2020240016 A1 | * | 12/2020 | ............ H04B 10/572 |
| WO | WO-2021233517 A1 | * | 11/2021 | ......... H02J 13/00034 |

OTHER PUBLICATIONS

Marracini, Philip J. et al., "Smart multiple-mode indoor optical wireless design and multimode light source smart energy-efficient links", Optical Engineering, vol. 52(5), 055001 (May 2013), SPIE, 8 pgs.

* cited by examiner

APPARATUS AND METHODS FOR EXCHANGING DATA IN A HYBRID OPTICAL WIRELESS COMMUNICATION SYSTEM

CROSS-REFERENCE TO PRIOR APPLICATIONS

This application is the U.S. National Phase application under 35 U.S.C. § 371 of International Application No. PCT/EP2021/087690, filed on Dec. 27, 2021, which claims the benefit of European Patent Application No. 21150473.3, filed on Jan. 7, 2021. These applications are hereby incorporated by reference herein.

FIELD OF THE INVENTION

The invention relates to the field of optical wireless communication networks, such as Li-Fi networks. More particularly, various methods, apparatus, systems, and computer-readable media are disclosed herein related to interoperability enhancement in a hybrid optical wireless communication system.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra. Furthermore, Li-Fi is directional and shielded by light blocking materials, which provides it with the potential to deploy a larger number of access points, as compared to Wi-Fi, in a densely populated area of users by spatially reusing the same bandwidth. These key advantages over the wireless radio frequency communication make Li-Fi a promising secure solution to mitigate the pressure on the crowded radio spectrum for IoT applications. Other benefits of Li-Fi include guaranteed bandwidth for a certain user, and the ability to function safely in areas otherwise susceptible to electromagnetic interference. Therefore, Li-Fi is a very promising technology to enable the next generation of immersive connectivity.

There are several related terminologies in the area of lighting-based communication. Visible-light communication (VLC) transmits data by intensity modulating optical sources, such as light emitting diodes (LEDs) and laser diodes (LDs), faster than the persistence of the human eye. VLC is often used to embed a signal in the light emitted by an illumination source such as an everyday luminaire, e.g., room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g., flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as UV and IR, for communication. Thus, Li-Fi is generally accepted as a derivative of optical wireless communications (OWC) technology, which makes use of the light spectrum in a broad scope to support bi-directional data communication.

In a Li-Fi system, the signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is the same, although variations may occur as a result of wavelength dependencies, such as in the case of refractive indices. In many instances there are advantages to using ultraviolet and/or infrared as these frequency ranges are not visible to the human eye, and more flexibility can be introduced in the system. Of course, ultraviolet quanta have higher energy levels compared to those of infrared and/or visible light, which in turn may render use of ultraviolet light undesirable in certain circumstances.

Based on the modulations, the information in the light can be detected using any suitable light sensor or photodetector. For example, the light sensor may be a photodiode. The light sensor may be a dedicated photocell (point detector), an array of photocells possibly with a lens, reflector, diffuser, or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

In the following, the term "access point" of a Li-Fi system is used to designate a logical access device that can be connected to one or more physical access devices (e.g., optical transceivers). Such a physical access device may typically, but not necessary, be located at a luminaire and the logical access point may be connected to one or more physical access devices each located at one or more luminaires. An access point in turn may serve one or more network devices or end devices associated to it to thereby form an optical cell.

WO2020240016 is related to an optical wireless communication (OWC) system, which comprises: an access point (AP) comprising a plurality of OWC transmitters and a plurality of OWC receivers; a station (STA) comprising at least one retroreflector; and a controller configured to control the OWC AP transmitters and/or OWC AP receivers; wherein the controller is configured to process data representative of at least one OWC signal that is received by at least one of the OWC AP receivers after having been transmitted by at least one of the OWC AP transmitters and reflected by the at least one retroreflector.

WO2018054894 is related to a lighting system, which comprises at least one light source and a mobile system, e.g. a mobile device, and at least one further device. The mobile system comprises a light sensor, a communication interface and a processor. The mobile system is configured to receive from a light source a light emission in which an identifier has been encoded, e.g. using Visible Light Communication (VLC) techniques, and to determine the identifier from the light emission). The mobile system is configured to join this group and to communicate with at least one further device from this group of devices.

SUMMARY OF THE INVENTION

To enable an electronic device or an end device to support higher data rate communication catering for IoT applications, optical wireless communication or Li-Fi is proposed as a complementary, or even replacing, technology to a wired connection or a radio frequency (RF) based wireless communication. An optical wireless communication (OWC) access point, or a Li-Fi access point, provides electronic devices or end devices within the corresponding optical cell access to an external network via an optical wireless link. The OWC access point can also support bi-directional optical links with more than one end device at the same time.

The part related to the optical wireless communication interface of an electronic device or an end device is typically called a Li-Fi end point in such an OWC network. The Li-Fi end point may be connected to an end device as a separate entity via a cable or be partially or entirely integrated in the end device. However, the complexity involved in supporting the OWC link with the infrastructure, such as the OWC access point, turns out to be a limiting factor in view of the form factor of a Li-Fi end point, preventing it from being fully integrated into a small portable device, such as a smartphone. Apart from these mechanical constraints, power consumption and heat dissipation may also be an issue there.

On the other hand, there is also a clear benefit to enable a peer-to-peer direct link between two mobile devices based on optical wireless communication technology. Such a direct wireless link can be a replacement to a wired connection leading to improved convenience. As compared to an alternative peer-to-peer wireless link, such as a radio frequency (RF) link based on Bluetooth technology, the direct optical wireless link provides considerable advantages in data rate and security aspects. Such advantages can be extremely attractive to smartphone users. However, as disclosed above, the integration of OWC interface in a smartphone imposes strict requirements on the OWC interface in terms of power consumption and form factor. A simplified design is highly desirable to facilitate integration.

In view of the above, the present disclosure is directed to methods, apparatus, systems, computer program and computer-readable media for facilitate the data exchange between a peer-to-peer optical wireless link and an OWC network. More particularly, the goal of this invention is achieved by an apparatus as claimed in claim 1, by an optical wireless communication system as claimed in claim 13, by a data exchanging method of an apparatus as claimed in claim 14, and by a computer program as claimed in claim 15.

In accordance with a first aspect of the invention an apparatus is provided. An apparatus for exchanging data in an optical wireless communication, OWC, system is configured to operate in a first mode to enable a first functionality, where the apparatus acts as a bridge device between an OWC access point and a first end device out of one or more end devices; or in a second mode to enable a second functionality, where the apparatus relays data between the first end device and a second end device out of the one or more end devices. The apparatus comprises a first optical transceiver configured to communicate with the OWC access point by means of a first type of optical wireless link using a first modulation scheme; a second optical transceiver configured to communicate with the first end device by means of a second type of optical wireless link using a second modulation scheme; and a hub component configured to select an operation mode out of a set comprising the first mode, the second mode, and another mode where both the first functionality and the second functionality are enabled; and connect using the first optical transceiver and/or the second optical transceiver depending on the operation mode selected; wherein the first optical transceiver has a wider beam angle as compared to the second optical transceiver.

Given the challenges to make a small portable device, such as a smartphone, directly connectable to an OWC network, an apparatus is disclosed to operate as an interface between the small portable device and the OWC network. Furthermore, the apparatus can also operate as a relay device between two small portable devices to extend the range beyond that of a direct optical wireless link, or to enable such a link when the two devices are located in positions where the optical beam cannot be aligned easily.

The first type of optical wireless link is used in an infrastructure based OWC network to establish the connection between an end device and an optical access point. The second type of optical wireless link is used in a peer-to-peer or device-to-device topology to establish the connection between two end devices. Since the optical access point is designed to support concurrent communication to one or more end devices located within its coverage area, the configuration of the first type of optical wireless link is of higher complexity as compared to the second type of optical wireless link.

The apparatus may operate in a first mode to bridge the first and second type of optical wireless links. In addition to the operation in the first mode as a bridge device between the optical access point and a first end device, the apparatus may also operate in a second mode as a relay device between two end devices via the second type of optical wireless link. Accordingly, the apparatus comprises a first optical transceiver and a second optical transceiver for communicating with the optical access point and the first end device, respectively. A hub component comprised in the apparatus is configured to select an operation mode for the apparatus, which is selected from a set comprising at least the first mode, the second mode, and a hybrid mode with both the first mode and the second mode enabled.

To avoid mutual interference between the first and second type of optical wireless links, different wavelengths may be employed among the different types of links. Furthermore, the second optical transceiver for the second type of optical wireless link has a narrower beam angle as compared to the first optical transceiver. Preferably, the second optical transceiver may be further arranged to point in a certain orientation towards its intended end device to further reduce interference to another first or second type of optical wireless link.

Advantageously, the first optical transceiver supports either a higher data rate or a longer communication distance as compared to the second optical transceiver.

The infrastructure based optical wireless link is typically of better performance than the peer-to-peer direct link, in terms of field of view (FoV), communication distance, date rate, and/or configuration flexibility. For example, the data rate supported by the first optical transceiver may be up to Gbps range, while the data rate supported by the second optical transceiver may be less than 500 Mbps. The first optical transceiver may support a communication distance more than 3 meters, while the second optical transceiver may only support a communication distance less than 3 meters. The differences on data rate and communication distance may be resulted from different output power levels and/or modulation and coding schemes.

In a preferred setup, the hub component is further configured to determine the operation mode according to at least one of: a user input, a predefined configuration parameter, a packet received by the first optical transceiver or the second optical transceiver, an input from the first optical transceiver or the second optical transceiver regarding a detection of the presence of the OWC access point, or a detection of the presence of one or more end devices.

The apparatus may operate with only one functionality enabled for power saving, or with multiple functionalities enabled concurrently for enhanced flexibility. The determination of the operation mode may subject to one or more factors. For example, the apparatus may be configured according to a predefined configuration parameter related to the application scenario. The apparatus may also be configured upon a user input, which may be related to a user preference or an application need.

Furthermore, the operation mode may also be determined based on a packet received by the first optical transceiver or the second optical transceiver, in which example the operation mode is controlled remotely. For example, a first end device would like to establish a direct optical wireless link with a second end device. However, the second end device is located either at a distance out of the maximum communication distance supported by the first end device or at an angle out of the FoV for the direct link. The first end device may simply send a packet with a destination address of the second end device to the apparatus. By checking the destination address, the apparatus will enable the second mode in the operation mode. Similarly, upon receiving a packet from another end device with the destination address not being a peer end device, the apparatus will enable the first mode in the operation mode to forward the packet to the optical access point.

The operation mode may also be determined autonomously, such as according to an input from the first optical transceiver or the second optical transceiver, which informs the hub component about a detection of the presence of the OWC access point, or a detection of the presence of one or more end devices. When there is no optical access point detected by the first optical transceiver, the apparatus may simply disable the first functionality in the operation mode. Accordingly, the first optical transceiver may enter a sleep mode. And then, the presence detection of an optical access point may be carried out by the first optical transceiver occasionally, which may be arranged according to a certain schedule or based on a trigger event, such as a movement of the apparatus.

In a preferred example, the first modulation scheme is according to an orthogonal frequency-division multiplexing, OFDM.

OFDM is widely used as a digital multi-carrier modulation method in many communication systems because it has a great advantage of robustness against severe channel conditions, such as narrowband interference or frequency selective fading. By splitting the entire band into a plurality of subcarriers, the system also has the flexibility to apply different modulation and coding schemes to individual subcarriers, which may be used to maximize the capacity of the channel. For optical wireless communication, unipolar OFDM modulation techniques are typically employed, such as ACO-OFDM, DCO-OFDM, ADO-OFDM and/or Flip OFDM.

Another advanced version is orthogonal frequency division multiple access (OFDMA). OFDMA is a multi-user enhancement of OFDM enabling concurrent AP communication (uplink & downlink) with multiple end devices by assigning subsets of subcarriers. OFDMA has more flexibility in providing different data rates or quality of service to different users, and in the meanwhile a high resource efficiency can be maintained despite of such diversity.

Thus, it is efficient to employ the modulation scheme of OFDM or OFDMA for the communication between the optical assess point and the one or more end devices in view of capacity of the optical cell.

However, from the end device side, OFDM may not be the most power efficient modulation scheme, since OFDM signals are applied around a DC bias, which compromise the power efficiency.

In another preferred example, the second modulation scheme is according to a pulse-amplitude modulation, PAM.

PAM is featured by the relative low complexity of modulation and demodulation. And thus, it is beneficial to be used by the direct link for reducing power consumption at an end device. Another advantage of using PAM for the direct link is that PAM may already be used by another data interface in the end device, and thus a digital processing component may be shared between the optical link and the other data interface in the end device. A further advantage in this scenario is that the optical link may also be used as an alternative to the other data interface towards another end device. The other data interface may be according to USB or HDMI.

In a further example, the second modulation scheme may be according to an on-off-keying (OOK) modulation. OOK is the simplest form of amplitude-shift keying (ASK). For many low power applications, OOK presents the advantage on its low complexity.

Advantageously, the beam angle of the first optical transceiver is at least 30 degrees.

The first optical transceiver aims to establish a reliable optical link with the optical access point with a relatively large FoV. With a relatively large beam angle, the connection between the apparatus and the optical access point can still be maintained when the apparatus is moving around in a relatively large area. The beam angle of the first optical transceiver is at least 30 degrees, and preferably equal to or larger than 35 degrees.

Preferably, the beam angle of the second optical transceiver (220) is at most degrees.

For the second type of optical wireless link, it is important to reduce the power consumption and form factor in view of the physical limitation imposed by the end device. Thus, a narrow beam link is a preferred design choice. The second optical transceiver has a beam angle of at most 20 degrees, and preferably equal to or less than 15 degrees.

In a preferred setup, the first type of optical wireless link supports point-to-multipoint communication.

Point-to-multipoint communication (P2MP) is a kind of one-to-many connection, providing multiple paths from a single location to multiple locations. Thus, it is desirable for the optical access point to support P2MP, which allows the optical access point to connect with multiple end devices/users simultaneously. It turns out to be an efficient manner to make use of the communication capacity of the optical cell.

In another preferred setup, the second type of optical wireless link is a point-to-point link.

To avoid the complexity involved in managing P2MP, the second type of optical wireless link preferably opts for point-to-point (P2P) communication, which serves as a dedicated connection between two end devices, or an end device and the apparatus thereby avoiding the coordination required for P2MP communication.

In a preferred setup, the apparatus comprises a third optical transceiver configured to communicate with another end device, out of the one or more end devices, by means of the second type of optical wireless link.

The apparatus plays a role of a bridge device or hub device in such a hybrid system. The apparatus may comprise more than one optical transceiver for the second type of optical wireless link, such as a third optical transceiver. When the first functionality is enabled in the operation mode, the apparatus may be used to act as a bridge device between the OWC access point and one or more end devices, such as the first end device and/or the other end device. When the second functionality is enabled in the operation mode, the apparatus may be used to relay data between the first end device and the other end device.

Depending on the application scenario, the apparatus may further comprise additional optical transceivers for the second type of optical wireless link to cater for a high-density deployment of end devices.

In one example, when the first functionality is enabled, the hub component is further configured to split data from packets received by the first optical transceiver; provide a first portion thereof to the second optical transceiver and provide a second portion thereof to the third optical transceiver.

To support various applications, an individual session may have a different data rate requirement. Sometimes, the difference can be significant. For example, the data rates required for sending a text message and for streaming high-resolution video differ by a few magnitudes. When the OWC access point is connected to more than one end device via the apparatus, it is efficient to combine communication data destined to different end devices in a same packet to reduce the communication overhead, considering some applications may only require very low throughput. In such scenarios, the hub component is further configured to rearrange the information conveyed in one or more data packets received from the OWC access point, before providing relevant information destined to different end devices to the second optical transceiver and the third optical transceiver, and/or a further optical transceiver.

Beneficially, the second optical transceiver and the third optical transceiver have a shared common part, and wherein the shared common part is not an optical front end.

Since the second optical transceiver and the third optical transceiver are configured to communicate by means of the same second type of optical wireless link, it is one option to make the second optical transceiver and the third optical transceiver share a common part to reduce the size, hardware cost, and power consumption, as compared to another option of deploying two identical optical transceivers.

An optical transceiver comprises several building blocks, such as a digital modulator and demodulator component (also called a modem component), an analog front end (AFE), and an optical front end. The common part may by either the modulator and demodulator component or the AFE, but not the optical front end. This is because the second optical transceiver and the third optical transceiver shall have dedicated optical front ends directed to different orientations.

Advantageously, the second optical transceiver and the third optical transceiver are directed to different field-of-views (FOVs), without overlap. Here overlap is envisaged to represent either the area covered by the respective transceivers, or alternatively the solid angle served by the transceiver.

The apparatus comprises one or more optical transceivers for the second type of optical wireless link, such as the second optical transceiver, the third optical transceiver, and a further optical transceiver. The one or more optical transceivers are directed to different FoVs with no overlap. There are several benefits. Firstly, such an arrangement can help to reduce mutual interference among multiple second type of optical wireless links. Secondly, given the relatively narrow beam angle of an individual optical transceiver, it also helps to increase the chance of establishing a connection between the apparatus and an end device and/or establishing multiple connections simultaneously between the apparatus and multiple end devices.

The different FoVs may be achieved via emission of optical signals either at different height relative to a same reference surface or different orientations at a same altitude or different altitudes. A ground floor or a table surface may be the reference surface considered.

In another example, when the second functionality is enabled, the second optical transceiver and the third optical transceiver are further configured to pass through a received data packet, which is destined for another end device out of the one or more end devices, to the respective optical transceiver without demodulation or decoding the payload part of the packet.

Operating as a relay node according to the second functionality, the apparatus may simply carry out an amplify-and-forward (AF) relay operation without demodulation or decoding the payload part of the packet received from an end device, given that the same modulation and coding scheme is used by the two end devices. This also reduce the latency introduced by the intermediate relaying operation. Upon receiving a data packet, the second optical transceiver and/or the third optical transceiver checks the packet header to determine if the packet is destined to another end device. If so, the packet is passed to the hub component without further demodulate and decode the information carried in the payload part. And then, the hub component will provide the packet to the corresponding optical transceiver directed to the intended destination end device.

In accordance with a second aspect of the invention an optical wireless communication system is provided. An optical wireless communication (OWC), system comprises an apparatus according to the present invention; and an OWC access point comprising a communication interface to a further network and an optical transceiver configured to communicate with the apparatus by means of a first type of optical wireless link using a first modulation scheme.

The optical wireless communication system may further comprise one or more end devices, each comprising another optical transceiver configured to communicate with a remote device by means of a second type of optical wireless link using a second modulation scheme, wherein the remote device is either the apparatus or another end device out of the one or more end devices.

In accordance with a third aspect of the invention a data exchanging method is provided. A data exchanging method of an apparatus in an optical wireless communication (OWC) system, the method comprising the apparatus operating in a first mode to enable a first functionality by acting as a bridge device between an OWC access point and a first end device out of one or more end devices; or in a second mode to enable a second functionality by relaying data between the first end device and a second end device out of the one or more end devices; the method further comprising the apparatus communicating with the OWC access point, by a first optical transceiver, by means of a first type of optical wireless link using a first modulation scheme; communicating with the first end device, by a second optical transceiver, by means of a second type of optical wireless link using a second modulation scheme; selecting an operation mode out of a set comprising the first mode, the second mode, and another mode where both the first functionality and the second functionality are enabled; and connecting using the first and/or the second optical transceiver depending on the operation mode selected; wherein the first optical transceiver has a wider beam angle as compared to the second optical transceiver.

The invention may further be embodied in a computing program comprising code means which, when the program is executed by an apparatus comprising processing means, cause the processing means to perform the method of the apparatus as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

Figure 1:
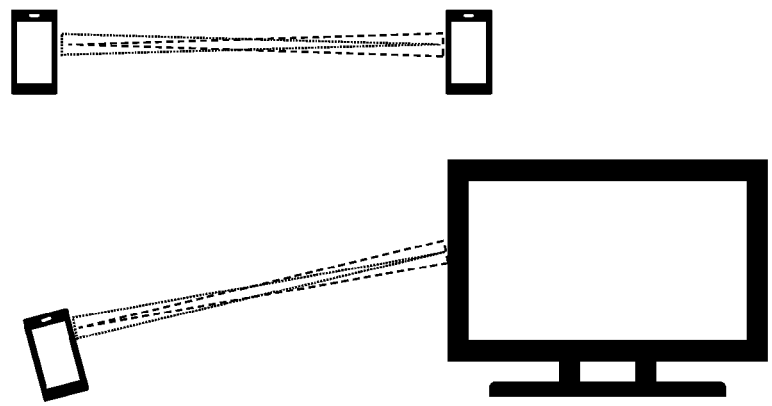
FIG. 1 illustrates peer-to-peer optical wireless links between end devices.

FIG. 1 illustrates peer-to-peer optical wireless links between end devices. An end device may be a smartphone, a tablet, a laptop, a remote controller, a TV, or another display device. The end device comprises an optical transceiver to serve the second type of optical wireless link, which is featured by a relatively narrow beam, such as with a beam angle of no more than 20 degrees. The narrow and dedicated beam has the advantage of providing higher energy efficiency in transmitting data. For example, to achieve the same data rate at a certain communication distance, a narrower beam optical link requires less transmit power as compared to a wider beam.

It is desirable to have the optical transceiver fully integrated in the end device, which can be quite appealing to a smartphone or tablet user. However, due to the small form factor of the end device itself, there are also more challenges to integrate both the electronics and optics of an optical transceiver in such a small end device, considering constraints such as physical dimensions, power consumption, heat dissipation, and scheduling complexity. Given all these constraints, typically it is considered that only a limited transmit power for OWC can be used by a small end device, such as a smartphone, a tablet, or a remote controller, and this results in short to medium range application with a limited beam angle/coverage. It is preferable to use modulation schemes without a DC bias to further improve the power efficiency. PAM and OOK are good candidates for such power efficient links.

The use cases are mainly for point-to-point (P2P) scenarios, such as device to device communication (smartphone to smartphone; smartphone to tablet; smartphone to laptop, smartphone to TV, tablet to tablet, etc.). As compared to a wired connection, it is advantageous to a wireless optical link. And then, the user does not have to worry about additional cables and the matching of interfaces between an end device and a cable. There are also non-optical wireless P2P communication techniques available, such as a RF based technology. However, due to the propagation properties of RF communications, it may be rather complex on the protocol level to build up the link to allow certain protection of the data, such as in a Wi-Fi direct case. Another commonly used P2P communication technique for smartphones is based on Bluetooth technology, which has a more limited data rate. Therefore, the disclosed narrow beam P2P optical link has advantages of a higher data rate, good security, and low complexity.

As disclosed above, tailored to the integration into a small end device, the second type of optical wireless link is no longer compatible to the conventional optical wireless link in an OWC network, or the first type of optical wireless link. On the other hand, from application point of view, it can be a significant enhancement if the small end device can also access the OWC network to fully enjoy the benefits brought by OWC. In view of this, an apparatus is disclosed in the present invention.

Figure 2:
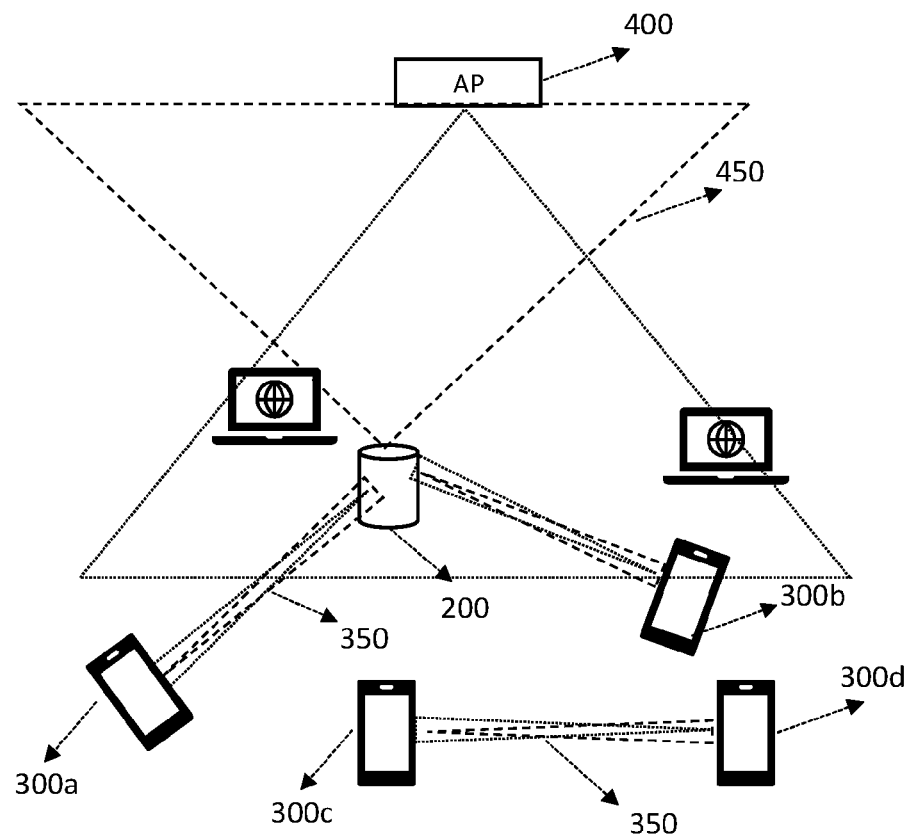
FIG. 2 demonstrates an apparatus operating as a bridge device in an OWC network for an end device or as a relaying device between two end devices.

FIG. 2 demonstrates the user scenario of the apparatus 200, which may operate as a bridge device in an OWC network for an end device 300 or as a relaying device between two end devices 300.

An infrastructure based OWC network comprises at least one OWC access point 400. There may be one or more end points in the coverage of the OWC access point 400. When there are more than one active end points in the optical cell, the OWC access point 400 is capable to establish multiple optical links with the more than one active end points simultaneously in a point-to-multipoint communication (P2MP). There may be other end point devices active in the same area together with the apparatus 200. The other end point devices shall also comprise optical transceivers supporting the first type of optical wireless link 450 in order to access the OWC network. As shown in the figure, the other end point devices may be laptops, PCs, or other electronic devices comprising or coupled to optical transceivers supporting the first type of optical wireless link 450.

The first type of optical wireless link 450 between the apparatus 200 and the OWC access point 400 is illustrated in the figure with the two bigger, shadowed triangles, respectively. Similarly, the second type of optical wireless link 350 between the apparatus 200 and an end device 300a, 300b, or between two end devices 300c, 300d, is illustrated with the smaller, shadowed triangles. It should be noted that the shapes and sizes of the triangles used in the figure serve as an exemplarily indication of the relative size and shape of the optical beams. Typically, the beam angle of the first type of optical wireless link 450 is at least 30 degrees (preferably equal to or larger than 35 degrees), while the beam angle of the second type of optical wireless link 350 is no more than 20 degrees (preferably equal to or smaller than 15 degrees). Furthermore, the supported communication distance is also longer by the first type of optical wireless link 450 than by the second type of optical wireless link 350. The electrical power to drive an optical front end for the second type of optical wireless link 350 is typically below 500 mW, and preferably below 250 mw, in view of constraints of an end device in terms of physical dimensions, power consumption, and heat dissipation. Another consideration of allowing a relatively low emission power by an optical transmitter for the second type of optical wireless link 350 is for eye safety reason, given that the end device, such as a smartphone, may be held by a user when enabling the second type of optical wireless link 350. Therefore, the communication distance of the second type of optical wireless link 350 is usually just up to 3 meters, while the communication distance of the first type of optical wireless link 450 is usually 3 meters or longer to provide sufficient coverage.

As demonstrated in the example of FIG. 2, the apparatus 200 may operate in a first mode with a first functionality to bridge the OWC access point 400 and a first end device 300a, 300b. The apparatus may also operate in a second mode with a second functionality to relay data between the first end device 300a and another end device 300b. The first functionality and the second functionality are not exclusive and can be enabled simultaneously. In another word, the operation mode of the apparatus 200 may be the first mode, the second mode, or another mode with both the first functionality and the second functionality enabled.

The two end devices 300c, 300d are within direct communication range, and in this case, they establish the P2P link 350 directly. If the two end devices 300c, 300d move apart or there is an obstacle blocking the line-of-sight path between them, they may resort to the apparatus 200 to maintain the connection via a relay at the apparatus 200.

Figure 3:
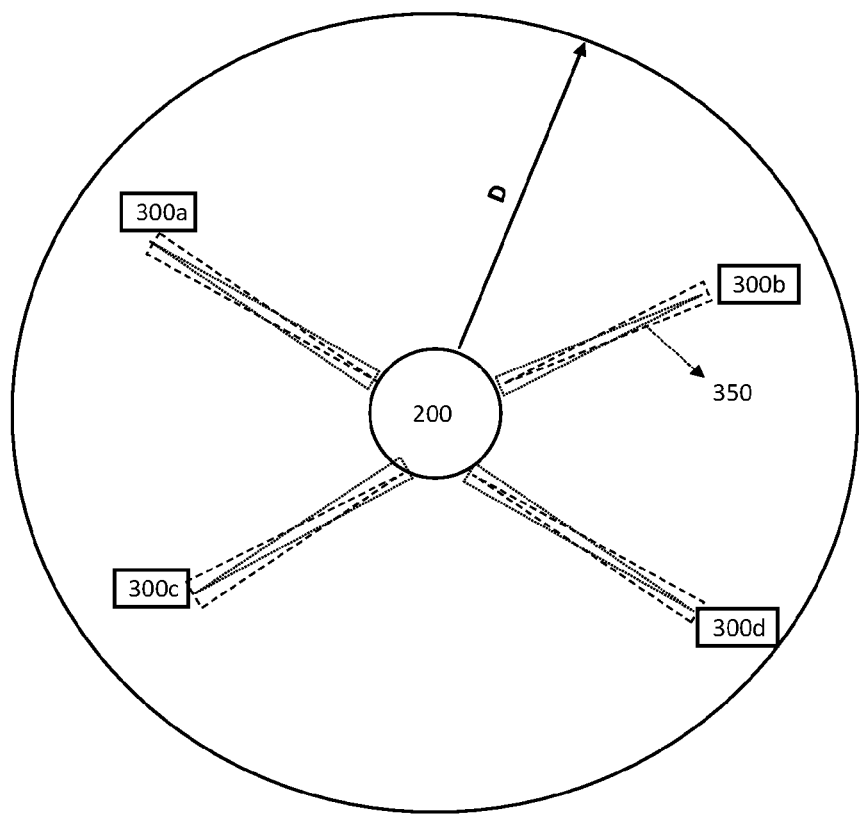
FIG. 3 provides a top view of an apparatus connecting to one or more end devices via a second type of optical wireless link.

FIG. 3 provides a top view of an apparatus connecting to one or more end devices 300a, 300b, 300c, 300d via a second type of optical wireless link 350. The apparatus may comprise one or more optical transceivers supporting the second type of optical wireless links 350, each directed to a different end device 300a, 300b, 300c, 300d. The one or more end devices 300a, 300b, 300c, 300d are within a maximum distance D from the apparatus 200. The maximum distance D is the same as the maximum communication distance between two end devices for establishing a direct optical link.

The information conveyed on the second type of optical wireless links 350 may be obtained by the apparatus 200 from the OWC access point 400 or from another end device, depending on the operation mode.

When the first functionality is enabled, data to be sent to different end devices may be combined in a same data packet sent from the OWC access point 400, given that the first type of optical wireless link 450 is typically of higher data rate as compared to the second type of optical wireless link 350. The apparatus 200 will then recompile the data and provide the corresponding portions of a packet to destined end devices, respectively. Same applies to the uplink situation. The apparatus 200 may combine data received from different end devices and send to the OWC access point 400 in a same packet. Such conversion may not add extra overhead to the apparatus. Since different modulation schemes are used by the first type of optical wireless link 450 and the second type of optical wireless link 350, digital processing to facilitate conversion between different modulation schemes is unavoidable.

When the apparatus is acting as a relay device between two end devices according to the second functionality, a data packet received from a second type of optical wireless link 350 may be passed through for transmission over another second type of optical wireless link 350 by the apparatus without demodulation or decoding the payload part of the packet. Thus, the operation in the apparatus is simplified, and the latency due to relaying is also reduced.

Figure 4:
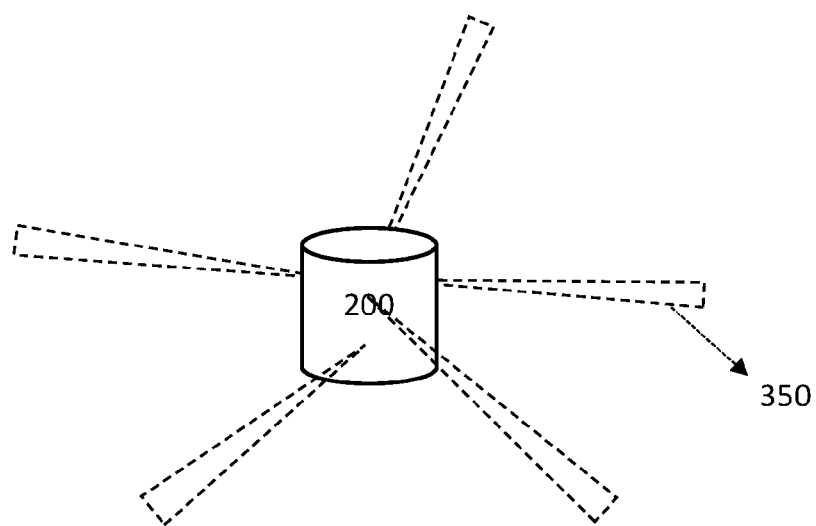
FIG. 4 provides a 2-D view of an apparatus capable of establishing one or more second type of optical wireless links simultaneously with no overlap.

FIG. 4 provides a 2-D view of an apparatus capable of establishing one or more second type of optical wireless links simultaneously with no overlapping. To avoid mutual interference among the one or more optical transceivers carrying out the second type of optical wireless links 350, the FoVs of the one or more optical transceivers have no overlap. The different FoVs may be achieved by arranging the one or more optical transceivers to emit optical signals either at different heights regarding a same reference surface or different orientations at a same altitude or different altitudes. A ground floor or a table surface may be the reference surface considered.

Thanks to the relatively narrow beam angle of the second type of wireless optical link, the apparatus may deploy and enable several second type of optical wireless links simultaneously directed to different end devices to satisfy a demanding application scenario.

Since the apparatus is capable to maintain one or more second type of optical wireless links simultaneously, it is also an option that one end device sends a same packet to more than one destination end devices via the relay of the apparatus. Thus, the P2P link of the second type of optical wireless link may be extended to an equivalent point-to-multipoint connection via the apparatus. This can be very convenient and efficient when a user wants to share the same information with several people simultaneously.

Figure 5:
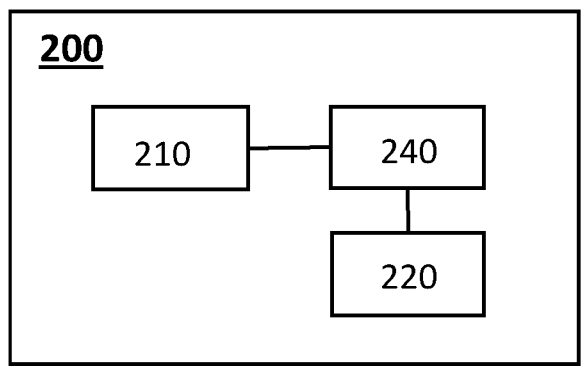
FIG. 5 schematically depicts basic components of an apparatus.

FIG. 5 schematically depicts basic components of an apparatus 200. The apparatus 200 comprises at least a first optical transceiver 210, a second optical transceiver 220, and a hub component 240. The first optical transceiver 210 is configured to communicate with the OWC access point 400 by means of a first type of optical wireless link 450 using a first modulation scheme. The first modulation scheme is preferably according to OFDM or OFDMA. For OWC, unipolar OFDM modulation techniques are typically employed, such as ACO-OFDM, DCO-OFDM, ADO-OFDM and/or Flip OFDM. The second optical transceiver 220 is configured to communicate with a first end device 300a, 300b, 300c, 300d by means of a second type of optical wireless link 350 using a second modulation scheme. Preferably, the second modulation scheme uses PAM or OOK, which is of lower complexity and is suitable for the low power consumption requirements of the second type of optical wireless link 350. The hub component 240 is configured to select an operating mode out of a set comprising the first mode, the second mode, and another mode with both the first functionality and the second functionality enabled; and connect using the first optical transceiver 210 and/or the second optical transceiver 220 depending on the operation mode selected.

Figure 6:
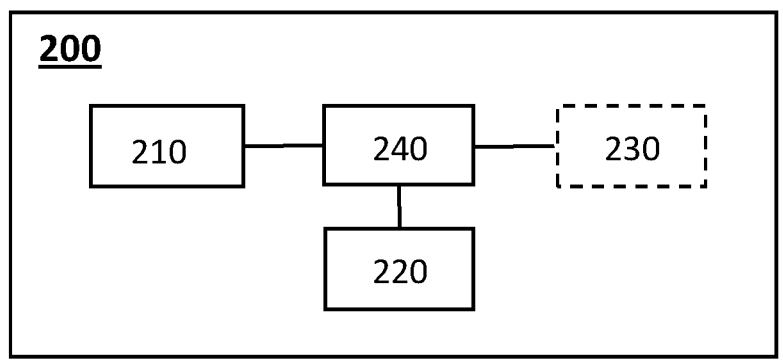
FIG. 6 schematically depicts another example of basic components of an apparatus.

As disclosed above, the apparatus 200 may be configured to communicate with multiple end devices simultaneously. Thus, as schematically depicts in FIG. 6, the apparatus 200 may comprise more than one optical transceiver 220, 230 for the second type of optical wireless link 350.

For ease of installation, it may be desirable that the apparatus is charged wirelessly, without the need for any power cable to supply it. Laser charging and RF charging are candidate solutions to wireless charging. Thus, the apparatus may be deployed dynamically depending on the distribution of end devices, such as to be placed on a table or at the center of a living room.

Figure 7:
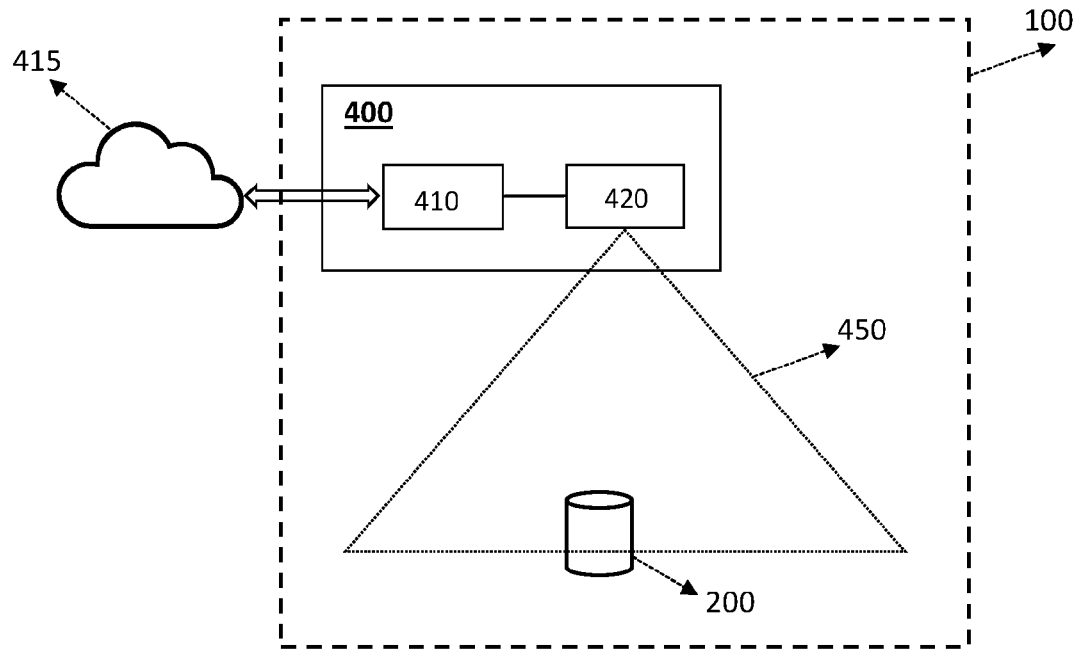
FIG. 7 demonstrates optical wireless communication system.

FIG. 7 demonstrates an optical wireless communication system 100. The optical wireless communication system 100 comprise at least an apparatus 200 according to the present invention and an OWC access point 400. As an example, the OWC access point 400 comprises at least a communication interface 410 to a further network 415 and an optical transceiver 420 configured to communicate with the apparatus 200 by means of the first type of optical wireless link 450 using the first modulation scheme. The communication interface may be a wired connection, such as Ethernet, or a wireless connection based on radio frequency (RF) or millimeter-wave. The further network 415 may be an IP network, or a backbone network.

Figure 8:
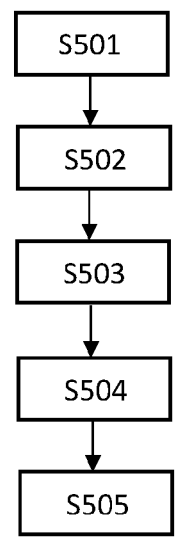
FIG. 8 shows a flow chart of a method of an apparatus.

FIG. 8 shows a flow chart of a method 500, the method may be executed using an apparatus 200 as discussed above. The method 500 comprises the following steps: in step S501, the apparatus 200 operating in a first mode to enable a first functionality by acting as a bridge device between an OWC access point 40) and a first end device out of one or more end devices 300a, 300b, 300c, 300); or in a second mode to enable a second functionality by relaying data between the first end device and a second end device out of the one or more end devices 300a, 300b, 300c, 300d. The method 500 further comprising the apparatus 200 communicating, in step S502, with the OWC access point 400, by a first optical transceiver 210, by means of a first type of optical wireless link 450 using a first modulation scheme; and in step S503 communicating with the first end device, by a second optical transceiver 220, by means of a second type of optical wireless link 350 using a second modulation scheme; and selecting, in step S504, an operation mode out of a set comprising the first mode, the second mode, and another mode with both the first functionality and the second functionality enabled; and connecting, in step S505, using the first and/or the second optical transceiver depending on the operation mode selected; wherein the first optical transceiver 210 has a wider beam angle as compared to the second optical transceiver 220.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g., for device control, data storage, data exchange, etc.) between any two or more devices and/or among multiple devices coupled to the network.

The invention claimed is:

1. An apparatus for exchanging data in an optical wireless communication, OWC, system configured to operate:
   in a first mode to enable a first functionality, where the apparatus acts as a bridge device between an OWC access point and a first end device out of one or more end devices; or
   in a second mode to enable a second functionality, where the apparatus relays data between the first end device and a second end device out of the one or more end devices;
   the apparatus comprising:
   a first optical transceiver configured to communicate with the OWC access point by means of a first type of optical wireless link using a first modulation scheme;
   a second optical transceiver configured to communicate with the first end device by means of a second type of optical wireless link using a second modulation scheme;
   a third optical transceiver configured to communicate with the second end device, out of the one or more end devices, by means of the second type of optical wireless link; and
   a hub component configured to:
      select an operation mode out of a set comprising the first mode, the second mode, and another mode where both the first functionality and the second functionality are enabled; and
      connect using at least two out of the first optical transceiver, the second optical transceiver, and the third optical transceiver depending on the operation mode selected;
   wherein the first optical transceiver has a wider beam angle as compared to the second optical transceiver or the third optical transceiver.

2. The apparatus of claim 1, wherein the first optical transceiver supports either a higher data rate or a longer communication distance as compared to the second optical transceiver.

3. The apparatus of claim 1, wherein the hub component is further configured to determine the operation mode according to at least one of: a user input, a predefined configuration parameter, a packet received by the first optical transceiver or the second optical transceiver, an input from the first optical transceiver or the second optical transceiver regarding a detection of the presence of the OWC access point, or a detection of the presence of one or more end devices.

4. The apparatus of claim 1, wherein the first modulation scheme is according to an orthogonal frequency-division multiplexing, OFDM.

5. The apparatus of claim 1, wherein the second modulation scheme is according to a pulse-amplitude modulation, PAM.

6. The apparatus of claim 1, wherein the beam angle of the first optical transceiver is at least 30 degrees.

7. The apparatus of claim 1, wherein the beam angle of the second optical transceiver is at most 20 degrees.

8. The apparatus of claim 1, wherein the second type of optical wireless link is a point-to-point link.

9. The apparatus of claim 1, wherein when the first functionality is enabled, the hub component is further configured to:
split data from packets received by the first optical transceiver;
provide a first portion thereof to the second optical transceiver; and
provide a second portion thereof to the third optical transceiver.

10. The apparatus of claim 1, wherein the second optical transceiver and the third optical transceiver have a shared common part, and wherein the shared common part is not an optical front end.

11. The apparatus of claim 1, wherein the second optical transceiver and the third optical transceiver are directed to different field-of-views, FOVs, with no overlap.

12. The apparatus of claim 1, wherein when the second functionality is enabled, the second optical transceiver and the third optical transceiver (230) are further configured to pass through a received data packet, which is destined for another end device out of the one or more end devices, to the respective optical transceiver without demodulation or decoding the payload part of the packet.

13. An optical wireless communication, OWC, system comprising:
an apparatus according to claim 1; and
an OWC access point comprising a communication interface to a further network and an optical transceiver configured to communicate with the apparatus by means of a first type of optical wireless link using a first modulation scheme.

14. A data exchanging method of an apparatus in an optical wireless communication, OWC, system, the method comprising the apparatus operating:
in a first mode to enable a first functionality by acting as a bridge device between an OWC access point and a first end device out of one or more end devices; or in a second mode to enable a second functionality by relaying data between the first end device and a second end device out of the one or more end devices;
the method further comprising the apparatus:
communicating with the OWC access point, by a first optical transceiver, by means of a first type of optical wireless link using a first modulation scheme;
communicating with the first end device, by a second optical transceiver, by means of a second type of optical wireless link using a second modulation scheme;
communicating with the second end device, by a third optical transceiver, by means of the second type of optical wireless link;
selecting an operation mode out of a set comprising the first mode, the second mode, and another mode where both the first functionality and the second functionality are enabled; and
connecting using at least two out of the first optical transceiver, the second optical transceiver, and the third optical transceiver depending on the operation mode selected;
wherein the first optical transceiver has a wider beam angle as compared to the second optical transceiver.

15. A non-transitory computer readable medium comprising instructions which, when the instructions are executed by an apparatus comprising a processor, cause the processor of the apparatus to perform the method of claim 14.

* * * * *